3,029,144
RECOVERY OF MERCURY FROM BRINE CONTAINING MERCURY SALTS IN SOLUTION
Robert S. Karpiuk and John J. Hoekstra, Midland, Mich., assignors to The Dow Chemical Company, Midland, Mich., a corporation of Delaware
No Drawing. Filed Mar. 9, 1960, Ser. No. 13,717
2 Claims. (Cl. 75—121)

The invention is concerned with the recovery of mercury metal from aqueous solutions containing mercury compounds therein. It is especially concerned with the recovery of mercury from brine effluent from a chlorine-producing cell employing a mercury cathode, usually referred to as a mercury chlorine cell.

In the operation of electrolytic cells of the mercury cathode type for the production of chlorine and caustic soda, a small percent of the metallic mercury of the cathode is normally dissolved in the brine and lost. Since the production of chlorine by the employment of the mercury cathode type cell is a large scale operation, even a small amount of mercury dissolved in the brine and lost per unit of product made constitutes an appreciable economic problem. Attempts have been made to provide a method which is useful in the recovery of mercury from effluent brine from mercury chlorine cells. Among such attempts are methods wherein (1) the effluent brine is subjected to the action of a soluble sulfide of an alkali metal or hydrogen thereby producing a mercury sulfide from which the mercury is thereafter removed, (2) subjecting the effluent brine to the action of iron pieces or turnings wherein the iron replaces the mercury of the compound in solution in the brine and the mercury is thereby rendered recoverable as metallic mercury, and (3) subjecting the effluent brine to the action of formaldehyde which reduces the mercury ions therein to metallic mercury.

Known methods of recovering the mercury from such brines have not been wholly satisfactory: the sulfides of mercury formed when the sulfide method is employed are colloidal and very difficult to cause to settle or to coalesce; iron and other multivalent compounds, e.g., vanadium, are formed in the brine when iron or its alloys are used, the brine thereby being contaminated with such compounds which are deleterious to mercury chlorine cell operation; the mercury formed by the reduction of mercury compounds in brines by the use of formaldehyde presents a similar problem to that faced when the sulfide method is employed, viz., production of the mercury in a highly subdivided state with accompanying problems of coalescence.

A need, therefore, exists for an improved method of recovering mercury from mercury-containing aqueous solutions, such as effluent brines from mercury chlorine cells, which is economical and has not associated therewith serious problems of coalescing and collecting the mercury sought to be recovered.

Accordingly, the principal object of the invention is to provide such a method, the steps of which are set out in the ensuing description and particularly defined in the appended claims.

The invention, therefore, is a method of recovering mercury from aqueous solution which comprises passing the solution and concurrently therewith an alkali metal amalgam through a bed, preferably longitudinally, through a vertical column of glass, ceramic, or plastic beads or fragments or Berl saddles or other non-metallic material which is substantially inactive to the brine, to the alkali metal amalgam, and to compounds normally found in the brine or amalgam, whereby a substantial proportion of the mercury in the brine forms additional dilute amalgam with the alkali metal amalgam and to some extent subsequently forms metallic mercury, mercury thereby being separated from the brine, either as diluted amalgam or as mercury metal. Both the diluted amalgam and the metallic mercury may be returned to the denuder or decomposition chamber of a mercury chlorine cell (where the amalgam is converted by hydrolysis to mercury and NaOH) or the mercury may be conveniently trapped below the bed of beads and thereafter tapped off as desired.

Any aqueous solution, hereinafter referred to as a brine, containing sufficient mercury compounds dissolved therein to justify the recovery of the mercury is satisfactory for the practice of the invention.

The alkali metal amalgam is a liquid at the temperature being employed. The alkali metal content of the amalgam, therefore, may be any percent which does not exceed the saturation point thereof. For example, when sodium amalgam is employed, the saturation point is about 0.6 percent by weight of sodium at 20° C. and about 1.0 percent at 70° C. The usual range of alkali metal in the amalgam is between 0.01 and 0.60 weight percent of the alkali metal. A preferred range of alkali metal in the amalgam is between 0.02 and 0.30 weight percent.

The beads or fragmented material employed in the practice of the invention is a non-metallic, non-reactive material preferably of a size varying between 1 and 20 millimeters. It is recommended that the depth of beads or fragments through which the brine and alkali metal amalgam pass should be at least 5 inches deep. Greater efficiency is obtained by having deeper columns or beds of the beads or fragments. It is recommended that it be at least about 25 to 30 inches deep. A column or bed of at least this depth is desired since higher mercury recovery is attained by passing through such depths. If it is desired that more mercury be removed than is conveniently removed by one pass through a single bed, a number of passes through the same bed, or more conveniently, successive passes through a series of beds are recommended whereby the alkali metal amalgam and brine from one bed are further cascaded through a second, third, and if desired, additional beds of beads or fragmented pieces. The brine usually employed is the spent brine from a mercury chlorine cell which usually contains anywhere from 1 to 50 parts of mercury per million parts of spent brine.

The alkali metal amalgam employed is usually the sodium amalgam from a mercury chlorine cell. The percent of sodium in the amalgam, as it comes from the cell during continuous operation, is within the aforestated percent of alkali metal that is satisfactory for the practice of the invention. A preferred range of sodium in the alkali metal amalgam employed in the practice of the invention, viz., between 0.2 and 0.3 percent, conveniently, is the usual sodium concentration of sodium amalgam from mercury cells employed in the production of chlorine.

The brine flow rate through the non-metallic, non-reactive beads or fragments in the column or bed should be between about 10 gallons and 80 gallons per minute per square foot of cross-section of the bed. The preferred flow rate is between 20 and 60 gallons per minute per square foot of said cross-section. Higher brine rates than this decrease the efficiency of the mercury removal. Lower brine rates reduce the quantity of brine treated to result in undesirably low plant capacity. The flow rate range or sodium amalgam employed concurrently with the brine may be between 17 and 90 pounds per minute per square foot of cross-section of the column and is preferably between 19 and about 60 pounds per minute per square foot of cross-section. Less efficient removal of mercury from the brine occurs at alkali metal amalgam flow rates lower than these limits.

The temperature of the brine is not highly critical and may be anywhere between 0° and 100° C. However, the higher temperatures within this range are preferred and efficiency is markedly increased above 65° C. For practical purposes, the temperature is usually that of the temperature of the mercury cell effluent, e.g., between 50° and 85° C.

In practicing the invention, the brine and the alkali metal amalgam are simultaneously fed into a column or bed of the non-metallic, non-reactive fragments or beads. The alkali metal amalgam is introduced at the top of a confining chamber, preferably a tower containing the bed of fragments or beads and passes downwardly therethrough. The brine may be introduced into the tower either above the bed of fragments or beads (usually below the entrance of the alkali metal amalgam) or below the bed and passed upwardly therethrough or countercurrent to the flow of alkali metal amalgam. Usually both the brine and sodium amalgam are obtained from a conveniently located mercury chlorine cell which may be the same or different cells and, after passage through the column of beds or fragments, the mercury-depleted brine is conducted back to be recycled to the electrolysis chamber. The outflowing amalgam and/or mercury are conducted back or recycled to the mercury chlorine cell again. The sodium amalgam and/or mercury is recycled back to the electrolyzing chamber if the diluted amalgam is below 0.01 percent sodium or to the decomposer section if the diluted amalgam is above 0.01 percent sodium.

The following example is illustrative of the practice of the invention.

A jacketed cylindrical Pyrex tower was employed which had an inlet at the top for amalgam, a second inlet near the top for brine, an outlet a short distance from the bottom for mercury-depleted brine, and a valve-controlled outlet in the bottom for sodium amalgam and/or mercury metal. The tower was also provided with a perforate support positioned a short distance above the brine outlet, upon which were placed 5-millimeter diameter glass beads to form a column having a depth of 25 inches. Effluent brine from an operating mercury chlorine cell containing 10 parts of mercury per million of brine, at a temperature of between 80° and 84° C., and sodium amalgam from the same mercury chlorine cell containing 0.204 percent sodium, were concurrently passed into the top of the column of glass beads and flowed downwardly therethrough. Both the brine and the sodium amalgam were well dispersed and the contacting surfaces greatly increased by contact with the glass beads. The amalgam became higher in mercury content and some metallic mercury was formed, passed on down through the bed of beads, and began to accumulate in the tower below the brine outlet. The valve in the amalgam outlet was closed. The mercury-depleted brine remained on top of the mercury and amalgam for a very short time and thereafter overflowed out the brine outlet. The valve in the amalgam outlet was then opened sufficiently to maintain in it the desired amalgam level in the tower below the brine outlet. The thus treated brine was returned via a suitable pipe to the electrolytic chamber of the chlorine cell. The sodium amalgam and mercury were returned to the denuder or decomposer chamber of the chlorine cell. A total of 24.6 gallons of brine were passed downwardly through the column of glass beads at a flow rate of 37 gallons per minute per square foot of cross-section of the glass bead column and, simultaneously therewith, 17.1 pounds of sodium amalgam were passed downwardly therethrough at a flow rate of 25.4 pounds per minute per square foot of cross-section of the glass bead column.

An analysis of the brine leaving the column of beads showed it to contain 7.2 parts per million of mercury showing a reduction in mercury content of 28 percent.

The example shows that an appreciable amount of the mercury was removed from the brine by one pass simultaneously with a suitable flow of an alkali metal amalgam, through a 25-inch column of glass beads. For increased efficiency in the recovery of mercury from the brine, it is recommended that the brine together with sodium amalgam be passed either a number of times through the same bed of fragments or beads or through a series of the same or similar columns to remove additional amounts of the mercury therefrom. From the above analysis of the brine, by only one pass through the beads it is calculated that 0.3 gram of mercury was removed from 24.6 gallons of brine. When this amount of mercury is calculated on the basis of the sodium passed through the column of beads, in the sodium amalgam, it is shown that 0.55 gram of sodium, contained in the amalgam, was used to produce the 0.3 gram of mercury.

A number of advantages are clearly to be realized by the practice of the invention, among which are: an effective method of removing mercury from aqueous solutions containing mercury compounds by passing the brine and conveniently available alkali metal amalgam through a bed of easily provided low-cost material in the form of inactive beads, fragments, and the like. The material requires little or no replacement. The invention lends itself readily to employing a number of columns of the inert fragmented material arranged in series so that treated brine and either recycled or fresh amalgam from a chlorine cell are successively passed downwardly therethrough to remove increasing amounts of the mercury therefrom. The sodium amalgam presents no considerable outlay or investment because the sodium amalgam is formed during the electrolysis of the brine to produce the chlorine and NaOH in the cell and is recycled back into the cell and continued in use. Further advantages include the natural coalescing capacity of the alkali metal amalgam for the reduced and finely divided mercury and the absence of any source of contamination of the brine, amalgam or recovered mercury.

Having described the invention, what is claimed and desired to be protected by Letters Patent is:

1. The method of recovering mercury from an aqueous solution containing compounds of mercury dissolved therein consisting of passing said solution at a temperature of between 0° and 100° C. and concurrently passing a liquid alkali metal amalgam, having an alkali metal content not in excess of the saturation point thereof in the amalgam, at least once through at least one bed which comprises at least 5 inches of non-metallic pieces of substantially inert material at a flow rate of said aqueous solution of between 10 and 80 gallons and said amalgam of between 17 and 30 pounds per square foot of cross-section of said bed per minute to reduce the mercury compounds in said solution to metallic mercury, and recovering the mercury thus reduced.

2. The method of recovering mercury from brine containing mercury compounds dissolved therein consisting of passing said brine at a temperature of between 65° and 100° C. and concurrently therewith, passing sodium amalgam, having a sodium content between about 0.1 and 0.6 percent, at least once through at least one bed of inert non-metallic pieces, having a particle size of between 1 and 20 millimeters having a depth of at least about 25 inches, at a flow rate of said brine of between 20 and 60 gallons and of said amalgam of at least 19 pounds per minute per square foot of cross-section of said bed, to reduce the mercury compounds in said brine, and recovering the mercury thus reduced.

References Cited in the file of this patent

UNITED STATES PATENTS

| | | |
|---|---|---|
| 2,703,752 | Glasser et al. | Mar. 8, 1955 |
| 2,732,284 | Sakowski | Jan. 24, 1956 |
| 2,860,952 | Bergeron et al. | Nov. 18, 1958 |

FOREIGN PATENTS

| | | |
|---|---|---|
| 756,205 | Great Britain | Mar. 16, 1954 |

OTHER REFERENCES

Mellor: Comprehensive Treatise on Inorganic and Theoretical Chemistry, vol. 4, Longmans, Green and Co., London, 1923, page 1019 relied on.